United States Patent
Kurtovic

(10) Patent No.: US 11,280,657 B2
(45) Date of Patent: Mar. 22, 2022

(54) DIPSTICK ASSEMBLY

(71) Applicant: Toyota Motor Engineering & Manufacturing North America, Inc., Plano, TX (US)

(72) Inventor: Kenan Kurtovic, Troy, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 324 days.

(21) Appl. No.: 16/589,716

(22) Filed: Oct. 1, 2019

(65) Prior Publication Data

US 2021/0096015 A1 Apr. 1, 2021

(51) Int. Cl.
*G01F 23/04* (2006.01)
*F01M 11/12* (2006.01)

(52) U.S. Cl.
CPC ............ *G01F 23/045* (2013.01); *F01M 11/12* (2013.01)

(58) Field of Classification Search
CPC .......................... G01F 23/045; F01M 2011/14
USPC .................................................... 33/722, 725
See application file for complete search history.

(56) References Cited

U.S. PATENT DOCUMENTS

| | | | |
|---|---|---|---|
| 2,611,145 A * | 9/1952 | Linstrom | G01F 23/045 15/220.4 |
| 4,110,909 A | 9/1978 | Mayr et al. | |
| 5,099,584 A | 3/1992 | Williams | |
| 5,154,005 A * | 10/1992 | Lalevee, Sr. | G01F 23/04 33/726 |
| 5,241,753 A * | 9/1993 | Lalevee, Sr. | G01F 23/04 33/722 |
| 6,676,320 B1 * | 1/2004 | Wainer | A46B 9/021 401/121 |
| 7,325,270 B2 * | 2/2008 | Hinojosa | G01F 23/045 15/210.1 |
| 7,578,071 B2 * | 8/2009 | Goldstein | G01F 23/04 33/725 |
| 8,136,261 B2 * | 3/2012 | Armistead | A43C 7/005 33/727 |
| 8,272,140 B2 * | 9/2012 | Goldstein | A45D 40/267 33/725 |

(Continued)

FOREIGN PATENT DOCUMENTS

DE 1023599 B 1/1958
DE 19644059 C2 12/1999

(Continued)

*Primary Examiner* — George B Bennett
(74) *Attorney, Agent, or Firm* — Christopher G. Darrow; Darrow Mustafa PC

(57) ABSTRACT

A dipstick assembly includes a tube, a dipstick, and a wiper. The dipstick assembly is alternatively configurable in a wiping configuration, in which the dipstick is mounted to the tube with the wiper therebetween, and in a standard configuration, in which the dipstick is mounted to the tube without the wiper therebetween. In the wiping configuration and in the standard configuration, the dipstick closes the tube, and reaches through the tube. In the wiping configuration, the dipstick reaches through the tube past the wiper, and the dipstick is alternatively withdrawable from the tube past the wiper, whereupon the wiper wipes the dipstick, and with the wiper, whereupon the wiper leaves the dipstick unwiped.

10 Claims, 2 Drawing Sheets

(56) References Cited

U.S. PATENT DOCUMENTS

| | | | |
|---|---|---|---|
| 8,459,891 B2 * | 6/2013 | Lhoyer | A45D 40/268 401/122 |
| 11,085,894 B2 * | 8/2021 | Ruch | G01N 27/283 |
| 2008/0072445 A1 * | 3/2008 | Harrison | G01F 23/045 33/725 |
| 2008/0098609 A1 | 5/2008 | Goldstein et al. | |
| 2021/0246816 A1 * | 8/2021 | Rosenberger | G01F 23/04 |

FOREIGN PATENT DOCUMENTS

| | | |
|---|---|---|
| FR | 1090791 A | 4/1955 |
| WO | 1996030728 A1 | 10/1996 |

* cited by examiner

DIPSTICK ASSEMBLY

TECHNICAL FIELD

The embodiments disclosed herein relate to vehicles and, more particularly, to dipstick assemblies for checking liquids in their reservoirs.

BACKGROUND

The typical vehicle that includes a liquid in a reservoir (e.g., engine oil in an engine oil reservoir) also includes an associated dipstick assembly for checking the liquid. In addition to a dipstick for dipping into the liquid, the typical dipstick assembly includes a tube for mounting the dipstick. The tube leads to the reservoir. In normal operation of the vehicle, the dipstick is mounted to the tube, and to check the liquid, the dipstick is withdrawn from the tube. When the dipstick is mounted to the tube, the dipstick reaches through the tube, and into the reservoir, where the dipstick dips into the liquid. When the dipstick is withdrawn from the tube, sample liquid from the reservoir is left on the dipstick. Accordingly, to check the liquid, the dipstick is withdrawn from the tube for a reading of the sample liquid.

SUMMARY

Disclosed herein are embodiments of a wiper-based dipstick assembly. In one aspect, a dipstick assembly includes a tube, a dipstick, and a wiper. The dipstick assembly is alternatively configurable in a wiping configuration, in which the dipstick is mounted to the tube with the wiper therebetween, and in a standard configuration, in which the dipstick is mounted to the tube without the wiper therebetween. In the wiping configuration and in the standard configuration, the dipstick closes the tube, and reaches through the tube. In the wiping configuration, the dipstick reaches through the tube past the wiper, and the dipstick is alternatively withdrawable from the tube past the wiper, whereupon the wiper wipes the dipstick, and with the wiper, whereupon the wiper leaves the dipstick unwiped. This and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a wiper-based dipstick assembly. In addition to a dipstick, the dipstick assembly includes a tube for mounting the dipstick, and a wiper for wiping the dipstick. The wiper is an add-on accessory for upgrading the dipstick assembly from a standard configuration, in which the dipstick is mounted to the tube without the wiper therebetween, and the dipstick assembly is fully functional notwithstanding the absence of the wiper, to a wiping configuration, in which the dipstick is mounted to the tube with the wiper therebetween.

Figure 1A:
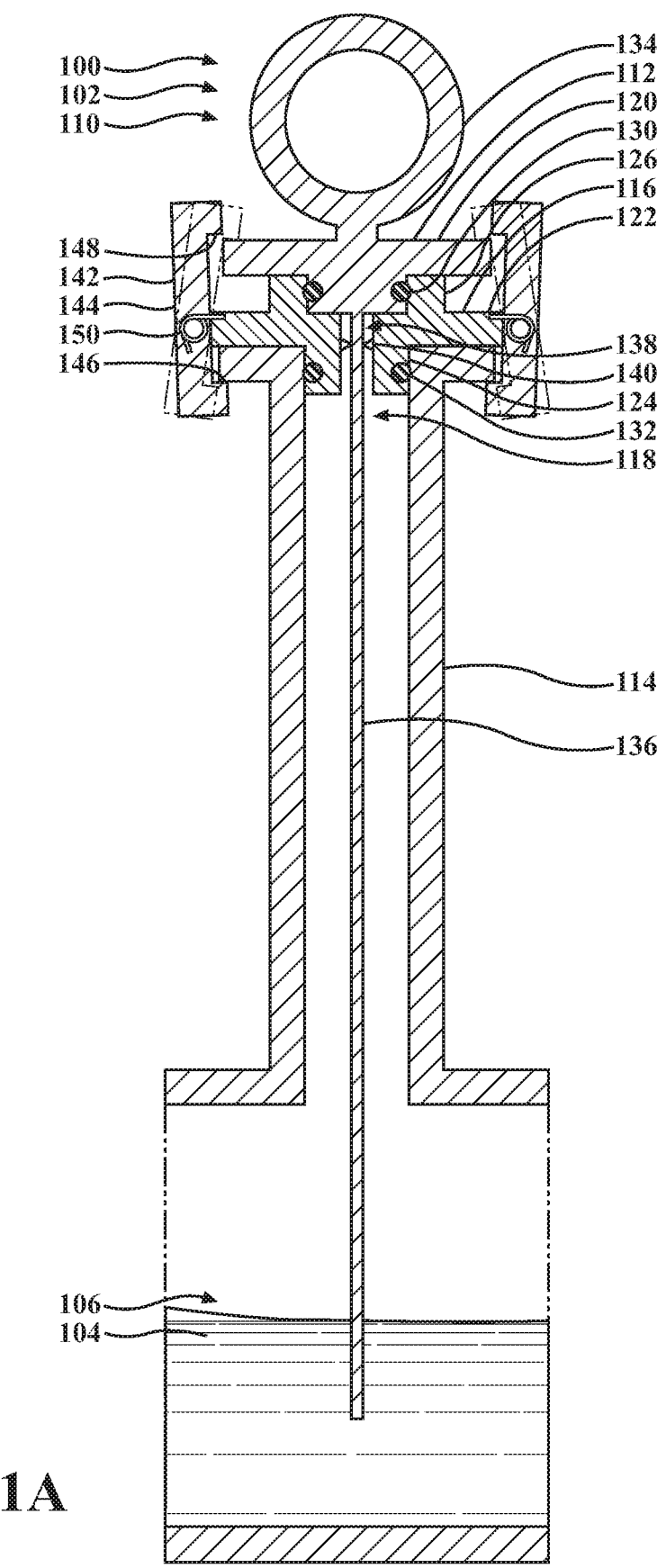
FIG. 1A is a partial cross-sectional view of a vehicle that includes a liquid in a reservoir, and an associated dipstick assembly for checking the liquid, showing a dipstick for dipping into the liquid, a tube for mounting the dipstick, and a wiper for wiping the dipstick.
Figure 1B:
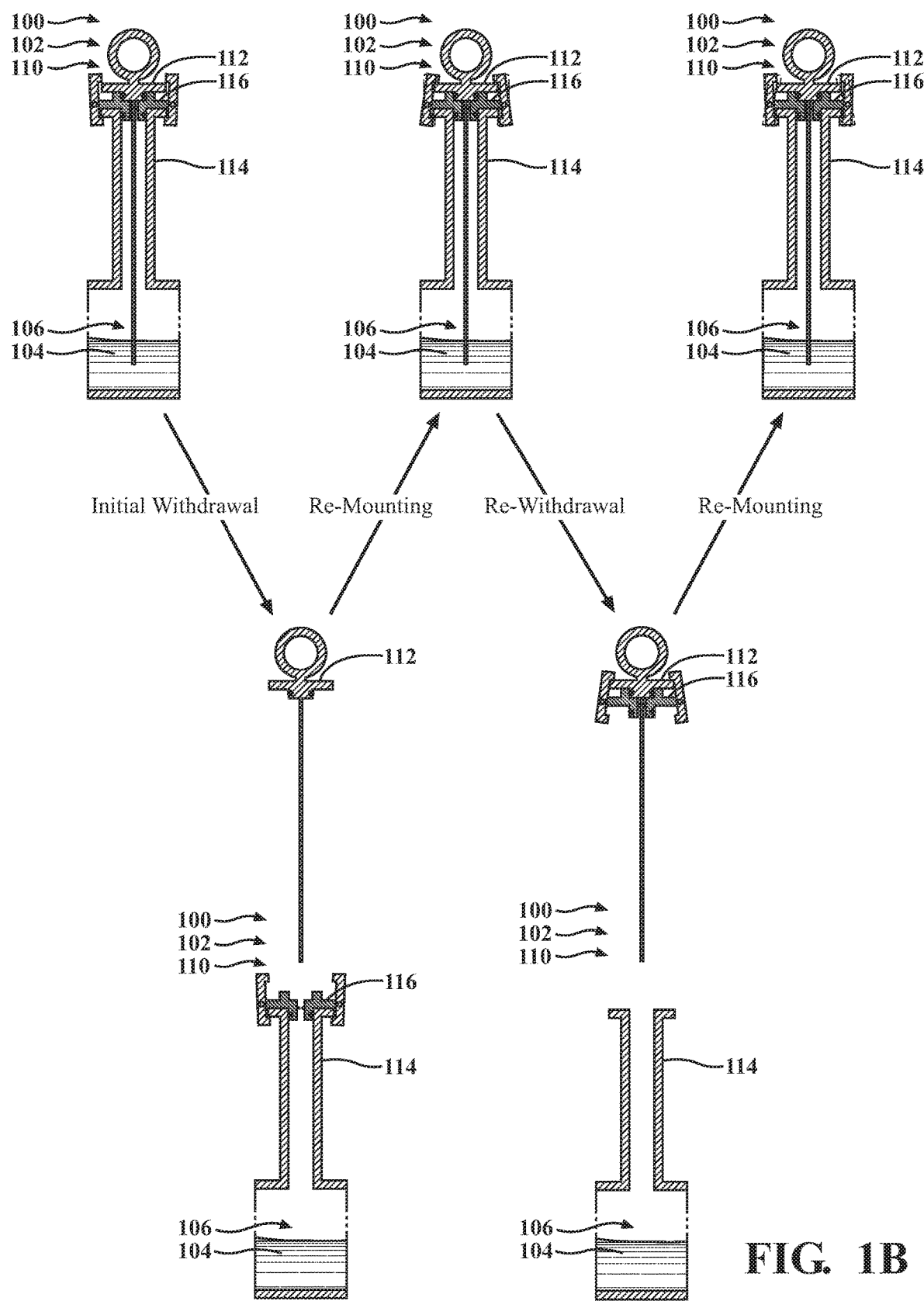
FIG. 1B represents, with reference to partial cross-sectional views of the vehicle, aspects of a process of checking the liquid using the dipstick assembly.

Part of a representative passenger vehicle 100 is shown in FIGS. 1A and 1B. The vehicle 100 includes an exterior and a number of interior compartments. The compartments include an engine compartment 102, as shown, as well as a passenger compartment, a cargo area and the like. Among other things, the vehicle 100 may include seats, a dash assembly, an instrument panel, controls and the like housed in the passenger compartment. Additionally, the vehicle 100 may include an engine, a motor, a transmission, a differential and the like, as well as other powertrain components, such as wheels, housed in the engine compartment 102 and elsewhere in the vehicle 100. The wheels support the remainder of the vehicle 100 on the ground. One, some or all of the wheels are powered by the remainder of the powertrain components to drive the vehicle 100 along the ground.

In the engine compartment 102, the vehicle 100 includes a liquid 104 in a reservoir 106, and an associated dipstick assembly 110 for checking the liquid 104. Although the reservoir 106, as shown, is an engine oil reservoir with engine oil therein, it will be understood that this disclosure is applicable in principle to otherwise similar reservoirs typical not only of vehicles, but also other machinery, such as transmission fluid reservoirs, differential fluid reservoirs, power steering fluid reservoirs, brake fluid reservoirs, hydraulic fluid reservoirs and the like.

In addition to a dipstick 112 for dipping into the liquid 104, the dipstick assembly 110 includes a tube 114 for mounting the dipstick 112, and a wiper 116 for wiping the dipstick 112. The tube 114 opens between the reservoir 106 and the engine compartment 102. The tube 114 leads from a user-accessible location in the engine compartment 102, where the tube 114 includes an open mouth 118, to the reservoir 106, where the tube 114 opens to the reservoir 106. In normal operation of the vehicle 100, the dipstick 112 is mounted to the tube 114, and to check the liquid 104, the dipstick 112 is withdrawn from the tube 114. Accordingly, the dipstick 112, from the same user-accessible location in the engine compartment 102 as the mouth 118, is withdrawable from (and re-mountable to) the tube 114.

The dipstick assembly 110 is alternatively configurable in a wiping configuration and in a standard configuration. In the wiping configuration, the dipstick assembly 110, as shown, includes the tube 114, the dipstick 112 and the wiper 116. With the wiper 116 mounted to the tube 114, and the dipstick 112 mounted to the wiper 116, the dipstick 112 is mounted to the tube 114 with the wiper 116 therebetween. In the standard configuration, the dipstick assembly 110 includes the tube 114 and the dipstick 112, but not the wiper 116. With the dipstick 112, absent the wiper 116, mounted to the tube 114, the dipstick 112 is mounted to the tube 114 without the wiper 116 therebetween.

Both in the wiping configuration and in the standard configuration, the dipstick 112 reaches through the tube 114, and into the reservoir 106, where the dipstick 112 dips into the liquid 104. Relatedly, when the dipstick 112 is withdrawn from the tube 114, sample liquid 104 from the reservoir 106 is left on the dipstick 112. Accordingly, to check the liquid 104, the dipstick 112 is withdrawn from the tube 114 for a reading of the sample liquid 104. For instance, the sample liquid 104 itself is readable to indicate the quality of the liquid 104. For instance, the coverage of the sample liquid 104 is readable to indicate the level of the liquid 104.

To aid indications of the level of the liquid 104, the dipstick 112 may include any manner of graduations, markings, instructions and the like.

Both in the wiping configuration and in the standard configuration, the dipstick 112 closes the tube 114. Among other things, it follows that in the standard configuration, with the dipstick 112 closing the tube 114, the dipstick assembly 110 is fully functional notwithstanding the absence of the wiper 116. The wiper 116, in turn, is an add-on accessory for upgrading the dipstick assembly 110 from the standard configuration to the wiping configuration. Accordingly, the dipstick assembly 110 may be employed across entire vehicle lineups with the same tube 114 and the same dipstick 112, and upgraded, by the addition of the wiper 116, from the standard configuration to the wiping configuration on a vehicle-by-vehicle basis.

In the standard configuration, to check the liquid 104, it will be understood that according to known processes, the dipstick 112 is initially withdrawn from the tube 114, and rags are used to clean the sample liquid 104 off the dipstick 112. The freshly-cleaned dipstick 112 is then re-mounted to the tube 114 for dipping into the liquid 104, and then re-withdrawn from the tube 114 for the reading of the sample liquid 104. To ready the vehicle 100 for normal operation, the dipstick 112 is then re-mounted to the tube 114.

In the wiping configuration, the dipstick 112 reaches through the tube 114 past the wiper 116. From between the tube 114 and the dipstick 112, the wiper 116 is alternatively securable to the tube 114 and to the dipstick 112. Correspondingly, the dipstick 112 is alternatively withdrawable from the tube 114 past the wiper 116 and with the wiper 116. Correspondingly, when the dipstick 112 is withdrawn from the tube 114, the wiper 116 is alternatively configured to wipe the dipstick 112 and to leave the dipstick 112 unwiped. Accordingly, when the wiper 116 is secured to the tube 114, the dipstick 112 is withdrawable from (and re-mountable to) the tube 114 past the wiper 116. When the dipstick 112 is withdrawn from the tube 114 past the wiper 116, the wiper 116 wipes the dipstick 112. On the other hand, when the wiper 116 is secured to the dipstick 112, the dipstick 112 is withdrawable from (and re-mountable to) the tube 114 with the wiper 116. When the dipstick 112 is withdrawn from the tube 114 with the wiper 116, the wiper 116 leaves the dipstick 112 unwiped.

As shown with particular reference to FIG. 1B, to check the liquid 104, the wiper 116 is secured to the tube 114, and the dipstick 112 is initially withdrawn from the tube 114 past the wiper 116. When the dipstick 112 is withdrawn from the tube 114 past the wiper 116, the wiper 116, when it wipes the dipstick 112, wipes the sample liquid 104 off the dipstick 112. Compared to known processes, there is no need to use rags to clean the sample liquid 104 off the dipstick 112. The freshly-wiped dipstick 112 is then re-mounted to the tube 114 past the wiper 116 for dipping into the liquid 104, the wiper 116 is then secured to the dipstick 112, and the dipstick 112 is then re-withdrawn from the tube 114 with the wiper 116 for the reading of the sample liquid 104. When the dipstick 112 is re-withdrawn from the tube 114 with the wiper 116, the wiper 116, when it leaves the dipstick 112 unwiped, leaves the sample liquid 104 on the dipstick 112 for the reading. To ready the vehicle 100 for normal operation, the dipstick 112 is then re-mounted to the tube 114 with the wiper 116. Moreover, to ready to the dipstick assembly 110 for checking the liquid 104 in the future, the wiper 116 is then re-secured to the tube 114.

As shown with particular reference to FIG. 1A, the dipstick 112 includes a cap 120 for mounting the dipstick 112, and closing the tube 114. The wiper 116 includes a base 122. As part of the base 122, the wiper 116 includes a tube adapter 124 and a cap adapter 126 extending from opposite sides of the base 122 for respectively mounting the wiper 116 and mounting the dipstick 112. In the wiping configuration, with the tube adapter 124 making a mating connection with the tube 114, and the base 122 otherwise seated against the tube 114, the wiper 116 is mounted to the tube 114. With the cap 120 making a mating connection with the cap adapter 126, and otherwise seated against the base 122, the dipstick 112 is mounted to the wiper 116. Moreover, with the cap 120, in conjunction with the base 122, covering the mouth 118, the cap 120 closes the tube 114 from superjacent the wiper 116. In the standard configuration, with the cap 120 making a mating connection with the tube 114, and otherwise seated against the tube 114, the dipstick 112 is mounted to the tube 114. Moreover, with the cap 120, by itself, covering the mouth 118, the cap 120 closes the tube 114 from superjacent the tube 114.

Compared to the standard configuration, in the wiping configuration, the tube adapter 124 makes a mating connection with the tube 114 in the place of the cap 120, and the cap 120 makes a mating connection with the cap adapter 126 in the place of the tube 114. As shown, for purposes of mounting the dipstick 112, and closing the tube 114, the cap 120 is a plug-style male connector with respect to the tube 114. The tube adapter 124, serving as an at least partial reproduction of the cap 120, is an annular male connector with respect to the tube 114. The cap adapter 126, serving as an at least partial reproduction of the tube 114, is an annular female connector with respect to the cap 120. Accordingly, in the wiping configuration, the tube adapter 124 makes a male-to-female mating connection with the tube 114, and the cap 120 makes a male-to-female mating connection with the cap adapter 126. In the standard configuration, the cap 120 makes a male-to-female mating connection with the tube 114. Although the cap 120, as shown, is a plug-style male connector with respect to the tube 114, and the above-described mating connections are male-to-female, it will be understood that this disclosure is applicable in principle to otherwise similar dipsticks whose caps are cover-style female connectors with respect to the tube 114, with the above-described male connectors and female connectors, and the above-described male-to-female mating connections, being reversed.

As shown, the above-described male connectors, the cap 120 and the tube adapter 124, respectively include an O-ring 130 and an O-ring 132 for making sealed male-to-female mating connections. In the wiping configuration, using the O-ring 132, the tube adapter 124 makes a sealed male-to-female mating connection with the tube 114. Using the O-ring 130, the cap 120 makes a sealed male-to-female mating connection with the cap adapter 126. In the standard configuration, using the O-ring 130, the cap 120 makes a sealed male-to-female mating connection with the tube 114.

In addition to the cap 120, the dipstick 112 includes a handle 134 and a rod 136 extending from opposite sides of the cap 120 for respectively handling the dipstick 112 and dipping into the liquid 104. As part of the base 122, the wiper 116 includes a passage 138 for passing the dipstick 112. Both in the wiping configuration and in the standard configuration, using the handle 134, the dipstick 112, from the same user-accessible location in the engine compartment 102 as the mouth 118, presents for handling, including withdrawal from the tube 114. Using the rod 136, the dipstick 112 reaches through the tube 114, and into the reservoir 106, where the dipstick 112, at a distal portion of the rod 136, dips into the liquid 104. Relatedly, when the dipstick 112 is withdrawn from the tube 114, the sample liquid 104 is left on the dipstick 112 at the distal portion of the rod 136. In the wiping configuration, with the dipstick 112, at a proximal portion of the rod 136, passing through the passage 138, the dipstick 112 reaches through the tube 114 past the wiper 116.

In addition to the base 122, the wiper 116 includes a wiping device 140 for wiping the dipstick 112. The wiping device 140 is aligned with the passage 138, and secured to the base 122. In the wiping configuration, when the dipstick 112 is withdrawn from the tube 114 past the wiper 116, the passage 138, and the wiping device 140, from its location in alignment with the passage 138, are drawn along the dipstick 112. When the wiping device 140 is drawn along the dipstick 112, using the wiping device 140, the wiper 116 wipes the dipstick 112, including the distal portion of the rod 136, where the sample liquid 104 is left on the dipstick 112, either alone or in addition to the remainder of the rod 136. When the dipstick 112 is withdrawn from the tube 114 with the wiper 116, the passage 138, and the wiping device 140, from its location in alignment with the passage 138, are not drawn along the dipstick 112. In the absence of the wiping device 140 being drawn along the dipstick 112, the wiper 116 leaves the dipstick 112 unwiped, including the distal portion of the rod 136, where the sample liquid 104 is left on the dipstick 112, either alone or in addition to the remainder of the rod 136.

As shown, for purposes of passing the dipstick 112, the passage 138 is a centrally-located aperture, and for purposes of wiping the dipstick 112, the wiping device 140 is in the central aperture. When the wiping device 140 is drawn along the dipstick 112, for purposes of wiping the dipstick 112, the wiping device 140 is configured to make and maintain wiping contact with the dipstick 112. For instance, the wiping device 140 may be or otherwise include one or more squeegee blades, including one or more pairs of opposing squeegee blades. For instance, the wiping device 140 may be or otherwise include one or more sponges, including one or more pairs of opposing sponges. For instance, the wiping device 140 may be configured to make and maintain wiping contact with the dipstick 112 notwithstanding the dipstick 112 including a twisted section. For instance, the wiping device 140 may be configured to make and maintain wiping contact with the dipstick 112 regardless of the rotational orientation of the dipstick 112.

In addition to the base 122, the wiper 116 includes a securing device 142 for securing the wiper 116. In the wiping configuration, the securing device 142 is alternatively configurable in a tube engagement configuration (rendered with solid lines in FIG. 1A) and in a dipstick engagement configuration (rendered with phantom lines in FIG. 1A). In the tube engagement configuration, with the securing device 142 engaging the tube 114 and disengaging the dipstick 112, the wiper 116 is secured to the tube 114. In the dipstick engagement configuration, with the securing device 142 disengaging the tube 114 and engaging the dipstick 112, the wiper 116 is secured to the dipstick 112. With the securing device 142 biased for the tube engagement configuration, the wiper 116 is biased for securement to the tube 114.

The securing device 142 may be or otherwise include one or more latches 144, including, as shown, a pair of opposing latches 144. Each latch 144 is alongside the base 122, and pivotally connected to the base 122. Each latch 144 includes a tube securing member 146 and dipstick securing member 148. From alongside the base 122, each latch 144 extends toward opposite sides of the base 122. From opposite sides of the base 122, each latch 144 carries the tube securing member 146 adjacent the tube 114, and carries the dipstick securing member 148 adjacent the dipstick 112. The latches 144 are alternatively pivotable to realize the tube engagement configuration and realize the dipstick engagement configuration. In the tube engagement configuration, with each latch 144 pivoted to engage the tube 114 from below and disengage the dipstick 112 from above respectively using the tube securing member 146 and the dipstick securing member 148, the wiper 116 is secured to the tube 114. In the dipstick engagement configuration, with each latch 144 pivoted to disengage the tube 114 from below and engage the dipstick 112 from above respectively using the tube securing member 146 and the dipstick securing member 148, the wiper 116 is secured to the dipstick 112. As shown, for each latch 144, the securing device 142 includes a spring 150 for biasing the wiper 116 for securement to the tube 114. For each latch 144, the spring 150 is engaged between the base 122 and the latch 144, and biases each latch 144 for pivotation to engage the tube 114 from below and disengage the dipstick 112 from above respectively using the tube securing member 146 and the dipstick securing member 148.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A dipstick assembly, comprising:
a tube;
a dipstick; and
a wiper; wherein
the dipstick assembly is alternatively configurable in a wiping configuration, in which the dipstick is mounted to the tube with the wiper therebetween, and in a standard configuration, in which the dipstick is mounted to the tube without the wiper therebetween;
in the wiping configuration and in the standard configuration, the dipstick closes the tube, and reaches through the tube; and
in the wiping configuration, the dipstick reaches through the tube past the wiper, and the dipstick is alternatively withdrawable from the tube past the wiper, whereupon the wiper wipes the dipstick, and with the wiper, whereupon the wiper leaves the dipstick unwiped.

2. The dipstick assembly of claim 1, wherein:
the dipstick includes a cap;
the wiper includes a tube adapter and a cap adapter;
in the wiping configuration, the tube adapter makes a mating connection with the tube, and the cap makes a mating connection with the cap adapter, and closes the tube; and
in the standard configuration, the cap makes a mating connection with the tube, and closes the tube.

3. The dipstick assembly of claim 2, wherein:
the tube adapter is an at least partial reproduction of the cap, and the cap adapter is an at least partial reproduction of the tube.

4. The dipstick assembly of claim 2, wherein:
in the wiping configuration, the tube adapter makes a male-to-female mating connection with the tube, and the cap makes a male-to-female mating connection with the cap adapter; and
in the standard configuration, the cap makes a male-to-female mating connection with the tube.

5. The dipstick assembly of claim 4, wherein:
the cap is a plug-style male connector with respect to the tube; and
the tube adapter is an annular male connector with respect to the tube, and the cap adapter is an annular female connector with respect to the cap.

6. The dipstick assembly of claim 4, wherein:
the cap includes an O-ring;
the tube adapter includes an O-ring;
in the wiping configuration, the tube adapter makes a sealed male-to-female mating connection with the tube using its O-ring, and the cap makes a sealed male-to-female mating connection with the cap adapter using its O-ring; and
in the standard configuration, the cap makes a sealed male-to-female mating connection with the tube using its O-ring.

7. The dipstick assembly of claim 1, wherein:
in the wiping configuration, the wiper is alternatively securable to the tube, whereupon the dipstick is withdrawable from the tube past the wiper, and to the dipstick, whereupon the dipstick is withdrawable from the tube with the wiper.

8. The dipstick assembly of claim 7, wherein: the wiper is biased for securement to the tube.

9. The dipstick assembly of claim 7, wherein:
the dipstick includes a cap;
the wiper includes a base and a securing device, the base including a tube adapter and a cap adapter, and the securing device including a latch alongside the base, and pivotally connected to the base;
in the wiping configuration, with the base seated against the tube, the tube adapter makes a mating connection with the tube, with the cap seated against the base, the cap makes a mating connection with the cap adapter, and closes the tube, and the latch is alternatively pivotable to engage the tube from below and disengage the dipstick from above, whereupon the wiper is secured to the tube, and to disengage the tube from below and engage the dipstick from above, whereupon the wiper is secured to the dipstick; and
in the standard configuration, the cap makes a mating connection with the tube, and closes the tube.

10. The dipstick assembly of claim 9, wherein:
the securing device includes a spring engaged between the base and the latch, the spring biasing the latch for pivotation to engage the tube from below and disengage the dipstick from above.

* * * * *